United States Patent
Gush et al.

(10) Patent No.: US 9,567,506 B2
(45) Date of Patent: *Feb. 14, 2017

(54) METHOD FOR MANUFACTURING ENCAPSULATED SUPERHARD MATERIAL

(75) Inventors: Keith Gush, Mold (GB); Mark Gregory Munday, Shannon (IE); Peter Schmock, Essen (DE); Stephen Kelly, Shannon (IE)

(73) Assignee: ELEMENT SIX LIMITED, County Clare (IE)

( * ) Notice: Subject to any disclaimer, the term of this patent is extended or adjusted under 35 U.S.C. 154(b) by 321 days.

This patent is subject to a terminal disclaimer.

(21) Appl. No.: 12/973,405

(22) Filed: Dec. 20, 2010

(65) Prior Publication Data

US 2012/0082786 A1 Apr. 5, 2012

Related U.S. Application Data

(63) Continuation of application No. 12/600,156, filed as application No. PCT/IB2008/052955 on Jul. 23, 2008, now abandoned.

(30) Foreign Application Priority Data

Jul. 23, 2007 (ZA) .............................. 2007/06077

(51) Int. Cl.
*B01J 13/04* (2006.01)
*C09K 3/14* (2006.01)

(52) U.S. Cl.
CPC .......... *C09K 3/1436* (2013.01); *C09K 3/1445* (2013.01); *Y10T 428/2991* (2015.01)

(58) Field of Classification Search
CPC .................................................... B01J 13/043
USPC ........................................ 427/212, 213, 217
See application file for complete search history.

(56) References Cited

U.S. PATENT DOCUMENTS

| | | |
|---|---|---|
| 3,243,349 A | 3/1966 | Goeddel |
| 3,255,036 A * | 6/1966 | Kramer et al. ............... 427/213 |
| 3,711,319 A | 1/1973 | Irikura et al. |
| 4,184,853 A * | 1/1980 | Otopkov et al. ................ 51/295 |
| 4,770,907 A * | 9/1988 | Kimura ........................ 427/217 |
| 4,895,733 A | 1/1990 | Imanidis et al. |
| 5,132,142 A | 7/1992 | Jones et al. |
| 5,143,523 A | 9/1992 | Matarrese |
| 5,284,678 A | 2/1994 | Hirschfeld et al. |
| 5,405,573 A | 4/1995 | Clark et al. |
| 5,980,982 A | 11/1999 | Degawa et al. |
| 6,354,728 B1 * | 3/2002 | Bretschneider et al. ..... 366/286 |
| 6,449,869 B1 | 9/2002 | Bretschneider et al. |
| 6,551,366 B1 | 4/2003 | D'Souza et al. |
| 6,551,659 B1 * | 4/2003 | Clough ........................ 427/217 |
| 2004/0121073 A1 | 6/2004 | George et al. |

FOREIGN PATENT DOCUMENTS

| | | |
|---|---|---|
| DE | 197 24 055 A | 12/1998 |
| DE | 19750042 A | 12/1998 |
| EP | 0 012 631 A | 6/1980 |
| GB | 1014295 | 12/1965 |
| JP | 59-164607 A | 9/1984 |
| JP | 8337498 A | 12/1996 |
| JP | 2002-526246 A | 8/2002 |
| JP | 2002-526738 A | 8/2002 |
| JP | 2002526738 A | 8/2002 |
| JP | 2004513986 A | 5/2004 |
| ZA | 2006/06674 | 8/2006 |

OTHER PUBLICATIONS

Office action from Japanese Patent Office for corresponding Japanese application 2010-517532 dated Apr. 27, 2012 with English translation.
Office action issued by Japanese Patent Office for corresponding Japanese application 2010-517532, mailing date May 24, 2013 with English translation.
Office action issued by European Patent Office for corresponding European patent application 08789415.0 dated Nov. 27, 2013.

* cited by examiner

*Primary Examiner* — Tabatha Penny
(74) *Attorney, Agent, or Firm* — Frommer Lawrence & Haug LLP

(57) ABSTRACT

A method of manufacturing encapsulated superhard material includes the steps of providing a source of superhard material, providing a mixture comprising an appropriate binder, a solvent or fluid medium and the intended coating or encapsulating layer, combining the superhard material and the mixture in a shovel rotor, the shovel rotor having a vessel including a rotor, the vessel adapted to receive a stream of gas. The rotor is rotated at an appropriate velocity such that the superhard material is encapsulated by the mixture.

13 Claims, 2 Drawing Sheets

METHOD FOR MANUFACTURING ENCAPSULATED SUPERHARD MATERIAL

CROSS REFERENCE TO RELATED APPLICATIONS

Figure 1:
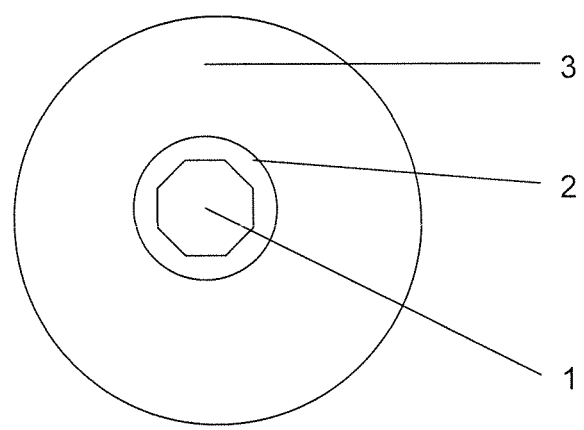

This application is a continuation of U.S. patent application Ser. No. 12/600,156 entitled "Method for Manufacturing Encapsulated Superhard Material" which is a 371 of International Application PCT/IB2008/052955 filed Jul. 23, 2008 and which claims priority benefits to South African Patent Application No. 2007/06077 filed Jul. 23, 2007, the disclosures of which are incorporated herein by reference.

INTRODUCTION

This invention relates to a method for manufacturing encapsulated superhard (abrasive) material. In particular, this invention relates to a method for manufacturing superhard material selected from diamond and cBN, the method including the step of using a shovel rotor.

BACKGROUND TO THE INVENTION

U.S. Pat. No. 4,770,907 (Kimura, Fuji Paudal, 1988), U.S. Pat. No. 5,143,523 (Matarrese, GE, 1992) and U.S. Pat. No. 5,405,573 (Clark et al., GE, 1995) all describe the use of fluidised beds to coat particles. In this method, ultra hard cores, e.g. diamond seeds, are suspended in a flow of gas within a chamber, into which a fine suspension of binder, solvent and particulate material (e.g. metal powder, the encapsulating material) is sprayed. Alternatively, the binder-solvent may be sprayed with separate powder addition. The emergent pellets are built up in volume proportional (non-linearly) to the residence time spent in the chamber. The advantage of this process is that the fluid bed allows a good separation of the core seeds and thereby ensures that a single core (diamond seed) is contained in each pellet while depositing coating material at a reasonable rate. The disadvantage of this technique is that the maximum deposition rate is relatively slow and when using a high density particulate coating material e.g. Mb, W and WC, and the increasing mass of the pellets presents difficulties in terms of the capabilities of the equipment to maintain the suspension. This can be addressed by increasing the capacity of the equipment but this is costly and impacts on the commercial viability of producing commercial volumes of material. In addition, fluid-bed type coatings are not ideal when coating with a mix of powders of different densities and particle shapes and sizes as the material has a tendency to segregate in the fluid bed and the intended composition may not be uniformly achieved.

The "rotating pan" method as described in GB1014295 (Norton, 1965) and EP0012631 (Tomlinson, DeBeers, 1983) involves introducing the ultra hard core material, e.g. diamond seeds, into either a rotating inclined pan, a drum or any other rotating vessel, where the pellet can be built up by 1) spraying a slurry containing metal powder, binder and solvent (encapsulating material) over the rotating diamond seeds and/or 2) the binder and solvent is/are sprayed separately and the metal powder then "sprinkled" over the rotating diamond seeds. Rotation of the pan separates the coated diamond seeds (emergent pellets) and allows time for removal of the solvent from the sprayed material to form a concentric jacket of encapsulating material which increases in volume as the process proceeds. This technique is efficient in terms of depositing encapsulating material and thus building up the pellet mass quickly. However, the difficulty with this method is that it is susceptible to agglomeration of the cores and/or early pellets in the initial stages of the process. Deposition rates must be very slow to avoid agglomeration and this increases the overall processing time and reduces the throughput of the process. Agglomeration reduces in severity after the emergent pellet has attained a critical size. The consequence of the agglomeration is that the final pellets may have significant size distribution and may contain more than one core per pellet. This contributes to increased process time and cost.

ZA2006/06674 (Flynn et al., E6, 2006) partly over come this problem by adopting a dual stage process for the rapid formation of pellets. Essentially the solution to the problems described above is to combine the two techniques known in the art into a single process design. As such, the initial stages of the process involve a fluid bed approach to maximise the yield of pellets containing one core particle only e.g. diamond seeds. The pellets may be built up to a critical size volume (Vcrit) whilst remaining in a fluid suspension. When the pellets attain this critical size, the pellets are transferred to a rotating pan where the pellets form the (sub) core of the final pellet process. The pellets so produced have a volume significantly greater than the pellets as introduced and the risk of agglomeration is much reduced as the layer on the surface absorbs the spray more quickly and thus deposition rates may be increased. In addition, the weightier particles are less likely to be held together by surface tension of the spray. However, combining both techniques requires two sets of capital equipment and downtime in terms of transferring material from one machine to the other.

Therefore, there is a need to develop a single technique which would overcome the technical difficulties outlined above and provide a more cost efficient solution to producing encapsulated abrasives. Preferably such a single technique provides an advantage when used in combination with either 'pan rotating' or 'fluidised' route.

SUMMARY OF THE INVENTION

According to a first aspect to the present invention there is provided a method of manufacturing encapsulated superhard material, the method comprising the steps of:
1. providing a source of superhard material,
2. providing a mixture comprising an appropriate binder, a solvent or fluid medium and the intended coating or encapsulating material,
3. combining the superhard material and the mixture in a shovel rotor comprising a vessel including a rotor, the vessel adapted to receive a stream of gas; and
4. rotating the rotor at a velocity such that the superhard material is encapsulated by the mixture.

The shovel rotor equipment is described in DE19750042, U.S. Pat. No. 6,449,869 and U.S. Pat. No. 6,354,728, the contents of which are incorporated herein by reference.

The superhard material may be selected from diamond, cubic boron nitride, wurtzitic boron nitride, a carbide, oxide or silicide, $Si_3N_4$, $SiC$, $Al_2O_3$, $AlC$, $SiO_2$ and/or clusters of any of the above. Most preferably the superhard material is diamond. The diamond may be natural or synthetic. Synthetic diamond may be synthesized by chemical vapour deposition or High Pressure High Temperature (HPHT) techniques.

Preferably the superhard material is present in the form of particles. The superhard particles are preferably at least about 0.01 um, preferably at least about 0.1 um, more preferably at least about 1 um in diameter. The superhard particle is preferably no greater than about 5 mm, preferably no greater than about 4 mm, more preferably no greater than about 3 mm in diameter. Preferably the particle has a size of from about 1 um to about 1.5 mm, measured across the greatest dimension of the particle. In this size range, the particles are known as micron, grit or monocrystal.

The particles may be pre-coated or clad particles and/or the particles may be partly encapsulated particles from an earlier process step using the same or different process technology. The particles (uncoated, coated, clad or encapsulated) may be referred to as seed particles.

DEFINITIONS

Encapsulated Particles

Encapsulated particles, such as abrasive grit, are particles that have been encapsulated within an envelope comprising a mass of particulate materials, such as metal, metal alloy, ceramic and/or cermet powders or combinations thereof, by any process involving the use of a distinct binder to hold the particulate material together. Typically the binder is an organic material. The binder may be subsequently removed and the particulate material can be partially or fully sintered.

Coated/Clad Particles

Coated particles can be described as having a core comprising at least one said particle which is fully or partially surrounded by a layer or layers of material either physically or chemically bonded to the surface of the particle. In this invention the coating differs to encapsulation in that the process for producing the coating does not rely on a binder material holding particulate material together immediately after deposition. The coating may either completely or partially cover the surface of the core particle(s). Processes for producing coatings include: chemical vapour deposition (CVD), physical vapour deposition (PVD), other equivalent hot or cold processes, plating, sol-gel or ceramic coatings produced using polymer pre-cursors. The coating thickness can be anything ranging from a mono-atomic layer up to hundreds of micron, but typically range from 0.1 um to 5 um. In instances where the coating thickness is large relative to the size of the abrasive particle (e.g. where the thickness of the coating is greater than about 5% the diameter of the core particle), then the coating can be further classified as a cladding. In the case of a cladding the preferred methods for deposition include electroless and electrolytic deposition.

In a preferred embodiment of the present invention, the vessel includes a rotor chamber which is filled with an appropriate volume of seed particles which may consist of (i) diamond or other superhard particles, and/or (ii) pre-coated or clad diamond or other superhard particles, and/or (iii) partly encapsulated diamond or other superhard particles from an earlier process step using the same or different process technology such as fluidised bed or rotating pan granulation. An illustration of the configuration of the seed particles is shown in FIG. 1. The seed particles are typically from 50 um to 2 mm in size.

It will be understood that other embodiments may range from the seed particle consisting of the suberabrasive only (i.e. diamond or cBN) which is then encapsulated using the shovel rotor method to the configuration described in FIG. 1.

The mixture may be in the form of a slurry. The slurry may be made up using:
 a binder selected from polyvinyl alcohol (PVA), polyvinyl butyral (PVB), methyl cellulose and/or other suitable generally organic binder systems;
 a solvent or fluid medium selected from water, deionised (DI) water and other suitable organic solvents;
 powdered solids (referred to as the source powder) selected from graphite, diamond or other superhard particles and/or metals powders including, but not limited to cobalt, iron, nickel, tungsten, copper, molybdenum and ceramics such as metal carbides from which the intended coating or encapsulating layer will be formed; and optionally
 agents selected from defoaming agents, wetting agents and viscosity modifiers to modify the properties of the slurry.

In a preferred embodiment of the present invention, the solvent or fluid medium is pre-mixed with the powdered solids.

In an alternative embodiment the powdered solids are not premixed with the solvent or fluid medium and are thus essentially dry. In a further alternative embodiment, some combination of dry and wet powders may be used.

In a preferred embodiment of the present invention the slurry takes the form of methyl cellulose and/or PVA in water with other agents selected from defoaming agents, wetting agents and viscosity modifiers to modify the properties of the slurry, and metal powders of appropriate composition. The viscosity and temperature of the slurry are preferably measured and controlled, along with the solids content and composition. The viscosity is generally in the range of 0.5 to 2000 mPa·s, while the temperature of the slurry is usually kept at a constant temperature close to room temperature (from 15 to 25° C.) and certainly at a temperature within the range in which the solvent or fluid medium is liquid.

Preferably, the method includes the step of passing a stream of warm air or other gas or gaseous mixture, hereafter referred to as "air", through the chamber of the shovel rotor, preferably through an aperture between the rotor and the wall of the vessel and optionally through a configuration of apertures in the rotor itself. The air flow, temperature and humidity may be controlled to give optimum operating conditions.

The purpose of the air is to dry off the solvent or fluid medium leaving the binder and powdered solids adhering to the surface of (encapsulating) the seed particles. The airflow is dependent on the cross section of the chamber, but typical average velocities in the chamber may range from 0.1 to 1 m.s$^{-1}$. The inlet temperature of the air is generally between room temperature and 200° C., whilst the relative humidity of the inlet air is between 0% and 100% but preferably less than 50% and even more preferably less than 20%.

A disc of the rotor is set to rotate at a velocity of between 60 and 600 rpm and angular momentum is transferred by contact forces between the disc and the seed particles so that they are carried in a stream around the chamber. Preferably the walls of the vessel include shovels or baffles fixed to the walls over which the seed particles are carried. These shovels add additional rotation and translation to the particles thus improving the deposition of powder onto the pellet (particle). The shovels also aid mixing the pellets by forcing them away from the sides of the vertical drum. During rotation, the pellets change position and orientation continuously as a result of the shovels ensuring an even pellet shell around the particle, preferably diamond. The slurry may be sprayed through a nozzle in the chamber which slurry then deposits and dries on the seed particles. The combination of air flow, particle trajectory and mechanical forces acting on the particles ensures that a smooth, spherical granule is formed with the source powder fixed by the binder in a uniform layer around the seed particle. The process preferably continues until the maximum limit to the product bed volume is reached. At this stage the process may be stopped and the product removed from the chamber. The process may be repeated with a portion of the encapsulated particles comprising the seed particles for the next process step.

In an alternative embodiment to that described in the preceding paragraph, dry powder may be fed separately from the slurry into the chamber. The slurry may contain powder in it or alternatively it may not contain any powder.

According to a second aspect to the present invention there is provided an encapsulated superhard material produced by a method as hereinbefore described.

The use of the shovel rotor technology according to the present invention combines high coating rates (resulting from the mechanical action of a rotating bed) with minimal agglomeration of the coated particles (due to the stirring imparted to the particle mass by the shovels or baffles). The result is a process comprising a single technique, coating rates equal to or better than those achieved with a pan granulator of similar size, combined with a surprisingly low incidence of agglomeration.

The deposition, or coating rate achievable using the shovel rotor is very much higher than that using the conventional pan rotator or fluidised bed methods known in the art. All else being equal, it was found that the shovel rotor coated diamond particles (25/35 US Mesh) at an average rate of about 1,200 g/hr, the pan rotator in the range of about 80 to 200 g/hr and the fluidised bed at about 10 g/hr. The binder is that of the examples for the shovel rotor.

Figure 2:
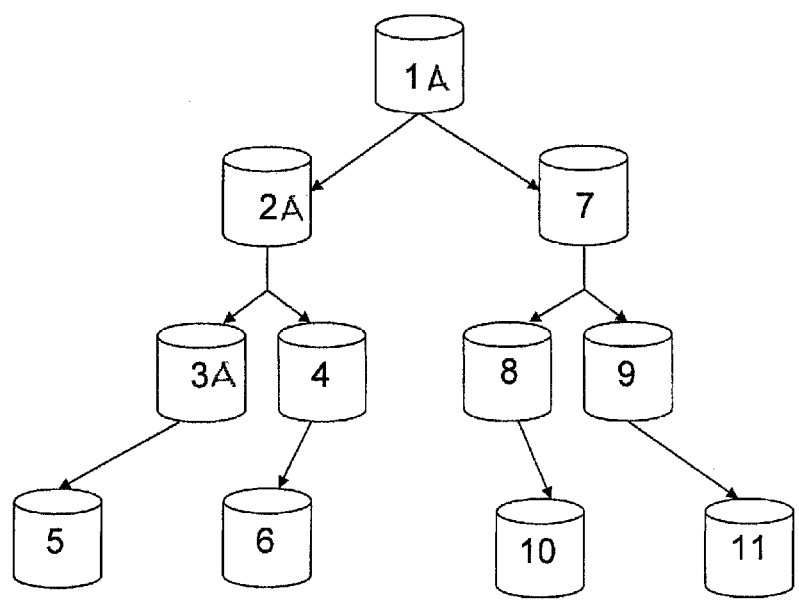

The invention will now be described with reference to the following non-limiting examples with reference to FIGS. 1 and 2 in which:

FIG. 1 is a schematic illustration of a seed particle in which 1 is the superhard (superabrasive) particle, for example diamond or cBN, 2 is the coating or cladding and 3 is a pre-encapsulated layer; and FIG. 2 is a schematic split batch process as exemplified in Example 1.

EXAMPLE 1

Seed Particle Comprising a TiC Coated Diamond Particle Encapsulated with a Single Layers Size 25/35 TC coated. Trials on a shovel rotor with a nominal 360 mm diameter chamber were performed using bond powder comprising approximately 65% TiC and 30% Co. The diamond used was coarse, high grade diamond pre-coated with a tungsten carbide layer of approximately 0.5 to 1.0 µm in thickness (Element Six's SDB1100+TC in 25/35 US mesh). The target was to reach a 90% assay (thus providing a concentration of 100-25% volume which is equal to 100 or 4.4 carats/cm$^3$).

The process is carried out in stages. When the material begins to get heavy on the rotor, the batch is split, and each split is brought up to assay accordingly (See the split batch process illustrated in FIG. 2). Results are set out below in Table 1:

TABLE 1

| Stage | Mass In (g) | Viscosity (mPa) | Air flow (m$^3$/hr) | Temp In (° C.) | Temp Out (° C.) | Spray Rate (g/min) | Rotor Speed (rpm) | Mass Out (g) |
|---|---|---|---|---|---|---|---|---|
| 1A | 5000 | 400-500 | 90-100 | 100-110 | 40-45 | 70-80 | 340-350 | 6400 |
| 2A | 2828 | 900 | 110-120 | 110 | 35-40 | 85-100 | 350 | 4320 |
| 3A | 4990 | 1500 | 100-115 | 120-125 | 40-50 | 100-105 | 300 | 8906 |
| 4 | 3870 | 1250 | 100-115 | 110-120 | 40-50 | 130-150 | 350 | 9909 |
| 5 | 8746 | 770 | 100-110 | 120 | 35-45 | 130-160 | 350-400 | 15332 |
| 6 | 8767 | 670 | 105-120 | 120 | 30-40 | 90-120 | 350 | 15358 |
| 7 | 3400 | 1550 | 100-115 | 100-110 | 40-50 | 100-145 | 350 | 5371 |
| 8 | 5428 | 900 | 110-120 | 110 | 35-40 | 90-120 | 350 | 13142 |
| 9 | 8234 | 670 | 100-120 | 120-125 | 35-45 | 90-95 | 297 | 12025 |
| 10 | 9500 | 800 | 100-110 | 120-125 | 35-50 | 150-160 | 297 | 17500 |
| 11 | 15248 | 740 | 100-120 | 120 | 30-40 | 80-100 | 217 | 21980 |

25,000 carats were encapsulated in the trials in a total time of 14 hours. These high deposition rates are excellent when compared with similar technologies. There was minimal agglomeration (1-2%) and high hit rates (99-100%).

The hit rate is defined as the percentage of pellets that contain a diamond. Due to the agitation of the pellet mass, the low viscosity of the slurry, and the high spray rates, the hit rate with the SR360 approaches 100%.

The average particle diameter produced was 1.6 mm and the assay was 90%.

EXAMPLE 2

Seed Particle Comprising a Bare Diamond Particle Encapsulated with a Single Layer Trials on a shovel rotor with a nominal 360 mm diameter chamber were performed using bond powder comprising approximately 65% TiC and 30% Co. The diamond used was coarse, high grade and uncoated. (Element Six's SDB1100 in 20/25 US mesh). The target was to reach a 90% assay.

Results are as set out in Table 2 below.

TABLE 2

| Stage | Mass In (g) | Viscosity (mPa) | Air flow (m³/hr) | Temp In (° C.) | Temp Out (° C.) | Spray Rate (g/min) | Rotor Speed (rpm) | Mass Out (g) |
|---|---|---|---|---|---|---|---|---|
| 1 | 5000 | 400-500 | 90-100 | 100-110 | 40-45 | 70-80 | 340-350 | 6400 |
| 2 | 2828 | 900 | 110-120 | 110 | 35-40 | 85-100 | 350 | 4320 |
| 3 | 4990 | 1500 | 100-115 | 120-125 | 40-50 | 100-105 | 300 | 8906 |
| 4 | 3870 | 1250 | 100-115 | 110-120 | 40-50 | 130-150 | 350 | 9909 |
| 5 | 8746 | 770 | 100-110 | 120 | 35-45 | 130-160 | 350-400 | 15332 |
| 6 | 8767 | 670 | 105-120 | 120 | 30-40 | 90-120 | 350 | 15358 |
| 7 | 3400 | 1550 | 100-115 | 100-110 | 40-50 | 100-145 | 350 | 5371 |
| 8 | 5428 | 900 | 110-120 | 110 | 35-40 | 90-120 | 350 | 13142 |
| 9 | 8234 | 670 | 100-120 | 120-125 | 35-45 | 90-95 | 297 | 12025 |
| 10 | 9500 | 800 | 100-110 | 120-125 | 35-50 | 150-160 | 297 | 17500 |
| 11 | 15248 | 740 | 100-120 | 120 | 30-40 | 80-100 | 217 | 21980 |

25,000 carats were encapsulated in the trials in a total time of 15 hours.

EXAMPLE 3

Seed Particle Comprising a TiC Coated Diamond Particle Encapsulated with a Multilayer Multilayered encapsulation trials on a shovel rotor with a nominal 360 mm diameter chamber were performed using bond powders as hereinbefore described. The diamond used was coarse, high grade and pre-coated with pre-coated with a tungsten carbide layer of approximately 0.5 to 1.0 μm in thickness (Element Six's SDB1100+TC in 25/35 US mesh). The target was to reach a 90% assay. 25,000 carats were initially encapsulated with powder to a thickness of 0.2 mm, followed by a second powder to the final assay.

Results are as set out in Table 3 below.

TABLE 3

| Stage | Mass In (g) | Viscosity (mPa) | Air flow (m³/hr) | Temp In (° C.) | Temp Out (° C.) | Spray Rate (g/min) | Rotor Speed (rpm) | Mass Out (g) |
|---|---|---|---|---|---|---|---|---|
| 1 | 5000 | 600 | 100-115 | 120-125 | 35-45 | 100-150 | 360 | 6650 |
| 2 | 2850 | 1250 | 100-115 | 110-120 | 40-50 | 130-150 | 350 | 9780 |
| 3 | 5000 | 1000 | 100-115 | 120-125 | 40-50 | 130-150 | 217 | 9700 |
| 4 | 3160 | 900 | 110-120 | 110 | 35-40 | 85-100 | 350 | 4680 |
| 5 | 8652 | 770 | 100-110 | 120 | 35-45 | 130-160 | 350-400 | 15300 |
| 6 | 8000 | 670 | 105-120 | 120 | 30-40 | 90-120 | 350 | 14400 |
| 7 | 2500 | 1500 | 100-115 | 100-110 | 40-50 | 100-150 | 350 | 5678 |
| 8 | 5420 | 880 | 110-120 | 110 | 35-40 | 90-120 | 350 | 12980 |
| 9 | 9450 | 800 | 100-120 | 120-125 | 35-45 | 150-160 | 217 | 16563 |
| 10 | 9500 | 670 | 100-110 | 120-125 | 35-50 | 150-160 | 217 | 18006 |
| 11 | 16230 | 740 | 100-120 | 120 | 30-40 | 80-100 | 217 | 22400 |

25,000 carats were encapsulated in the trials in a total time of 15 hours.

EXAMPLE 4

Seed Particle Comprising a Micron Sized Diamond with a Thick Nickel Cladding, Pre-Encapsulated with a Graphite/Nickel/Iron Mixture Encapsulation of pre-clad micron sized diamond. Seed material comprising diamond particles with an approximate mean diameter of 25 μm, pre-clad with electroless nickel to a diameter of 90 μm was provided. 94% assay was targeted using carbonyl iron, nickel and graphite with a PVA binder, Mowiol 4/88 and glycerin. The rotor was operated at between 30% and 50% of its capacity corresponding to 217 and 380 rpm respectively. The inlet air temperature was 80° C. while the outlet was between 35° C. and 50° C. and with a flow rate of between 100 and 350 m³/hour. These conditions produced a deposition rate 100 to 300 g/min. The SR360 produced particles with an average diameter of 1.3 mm and at a 94% assay.

Results are as set out in Table 4 below.

TABLE 4

| Stage | Mass In (g) | Air flow (m³/hr) | Temp In (° C.) | Temp Out (° C.) | Deposition Rate (g/min) | Rotor Speed (rpm) | Mass Out (g) |
|---|---|---|---|---|---|---|---|
| 1 | 5000 | 120 | 80 | 35 | 100 | 380 | 7000 |
| 2 | 3260 | 140 | 80 | 35 | 140 | 380 | 10200 |
| 3 | 5100 | 200 | 80 | 40 | 180-200 | 380 | 10150 |
| 4 | 4000 | 200 | 80 | 45 | 180-200 | 360 | 6500 |
| 5 | 9500 | 350 | 80 | 45 | 300 | 217 | 18500 |
| 6 | 9000 | 350 | 85 | 50 | 300 | 217 | 17890 |
| 7 | 4620 | 140 | 80 | 35 | 140 | 380 | 8000 |
| 8 | 6500 | 200 | 80 | 40 | 180-200 | 380 | 14638 |
| 9 | 10235 | 200 | 80 | 45 | 180-200 | 360 | 18900 |
| 10 | 11360 | 350 | 80 | 45 | 300 | 217 | 19687 |
| 11 | 18211 | 350 | 85 | 50 | 300 | 217 | 26300 |

The invention claimed is:
1. A method of manufacturing encapsulated superhard material, the method including the steps of:
  providing particles of superhard material,
  providing a mixture comprising an appropriate binder, a solvent or fluid medium and coating or encapsulating material, providing a shovel rotor comprising a vessel including a rotor and walls that include shovels or baffles fixed thereto, the vessel adapted to receive a stream of gas, combining the superhard material and the mixture in the shovel rotor such that the superhard material is carried over the shovels or baffles that add additional rotation and translation thereto, and rotating the shovel rotor at a velocity such that the superhard material is encapsulated into pellets by the mixture, wherein less than 2% of the pellets of encapsulated material contain more than one particle of superhard material, wherein the superhard material is selected from the group consisting of diamond, cubic boron nitride, wurtzitic boron nitride, a carbide, oxide or silicide, $Si_3N_4$, SiC, $Al_2O_3$, AlC, $SiO_2$ and/or clusters of any of the above.

2. A method according to claim 1 wherein the superhard material is present in the form of particles of at least about 0.01 um and no greater than about 5 mm in diameter.

3. A method according to claim 1 wherein the superhard material is in the form of particles that are pre-coated or clad particles and/or which are partly encapsulated particles from an earlier process step using the same or different process technology.

4. A method according to claim 1 wherein the vessel includes a rotor chamber which is filled with a volume of seed particles selected from diamond or other superhard particles, pre-coated or clad diamond or other superhard particles and partly encapsulated diamond or other superhard particles from an earlier process step using the same or different process technology.

5. A method according to claim 1 wherein the mixture is in the form of a slurry.

6. A method according to claim 5 wherein the slurry is made up using: a binder selected from polyvinyl alcohol (PVA), polyvinyl butyral (PVB), methyl cellulose and other suitable generally organic binder systems; a solvent or fluid medium selected from water, deionised (DI) water and other suitable organic solvents; powdered solids selected from graphite, diamond or other superhard particles and metals powders including cobalt, iron, nickel, tungsten, copper, molybdenum and ceramics including metal carbides from which the intended coating or encapsulating layer will be formed; and optionally agents selected from defoaming agents, wetting agents and viscosity modifiers to modify the properties of the slurry.

7. A method according to claim 6 wherein the solvent or fluid medium is pre-mixed with the powdered solids.

8. A method according to claim 5 wherein powdered solids of the mixture are not premixed with the solvent or fluid medium and are essentially dry.

9. A method according to claim 5 wherein the viscosity of the slurry is generally in the range of 0.5 to 2000 mPas.

10. A method according to claim 5 wherein the temperature of the slurry is kept at a constant temperature close to room temperature (from 15 to 25° C.).

11. A method according to claim 1 including the step of passing a stream of warm air or other gas or gaseous mixture through the vessel of the shovel rotor.

12. A method according to claim 11 wherein the relative humidity of the air is less than 50%.

13. A method according to claim 1 wherein a disc of the rotor is set to rotate at a velocity of between 60 and 600 rpm.

* * * * *